US009803555B2

(12) United States Patent
Rohrssen et al.

(10) Patent No.: US 9,803,555 B2
(45) Date of Patent: Oct. 31, 2017

(54) FUEL DELIVERY SYSTEM WITH MOVEABLY ATTACHED FUEL TUBE

(71) Applicant: General Electric Company, Schenectady, NY (US)

(72) Inventors: Robert Joseph Rohrssen, Greenville, SC (US); David William Cihlar, Greenville, SC (US); Patrick Benedict Melton, Horse Shoe, NC (US); Lucas John Stoia, Taylors, SC (US)

(73) Assignee: General Electric Company, Schenectady, NY (US)

( * ) Notice: Subject to any disclaimer, the term of this patent is extended or adjusted under 35 U.S.C. 154(b) by 716 days.

(21) Appl. No.: 14/259,443

(22) Filed: Apr. 23, 2014

(65) Prior Publication Data

US 2015/0308349 A1 Oct. 29, 2015

(51) Int. Cl.
*F02C 7/32* (2006.01)
*F02C 7/22* (2006.01)
*F23R 3/28* (2006.01)
*F23R 3/34* (2006.01)
*F23R 3/00* (2006.01)

(52) U.S. Cl.
CPC .............. *F02C 7/32* (2013.01); *F02C 7/222* (2013.01); *F23R 3/28* (2013.01); *F23R 3/283* (2013.01); *F23R 3/002* (2013.01); *F23R 3/34* (2013.01); *F23R 3/346* (2013.01)

(58) Field of Classification Search
CPC .. F02C 7/22; F02C 7/222; F23R 3/002; F23R 3/34; F23R 3/346; F23R 3/28
See application file for complete search history.

(56) References Cited

U.S. PATENT DOCUMENTS

| 2,930,192 | A | * | 3/1960 | Johnson | F23R 3/02 60/746 |
| 3,492,030 | A | * | 1/1970 | Lund | F16L 27/111 285/300 |
| 3,760,590 | A | * | 9/1973 | Bader | F02K 3/10 60/39.825 |
| 3,764,071 | A | * | 10/1973 | Carlisle | F23D 11/10 239/132.5 |
| 3,958,416 | A | * | 5/1976 | Hammond, Jr. | F23R 3/34 239/406 |
| 3,982,693 | A | * | 9/1976 | Hulsing | F02M 57/02 239/533.3 |
| 3,998,581 | A | * | 12/1976 | Hemingway | F23R 3/346 431/158 |

(Continued)

FOREIGN PATENT DOCUMENTS

EP 2554910 1/2012
EP 2629018 12/2013

*Primary Examiner* — Pascal M Bui Pho
*Assistant Examiner* — Eric Linderman
(74) *Attorney, Agent, or Firm* — Dority & Manning, P.A.

(57) ABSTRACT

A fuel delivery system for a gas turbine combustor is provided. The fuel delivery system includes a fuel tube and an attachment assembly. The fuel tube extends from a downstream injector (e.g., a late lean injector) towards a mounting ring of the combustor and is moveably attached to the mounting ring using the attachment assembly. Accordingly, the exemplary fuel delivery system may provide fuel to a downstream injector while accommodating a thermal expansion or contraction of the fuel tube along an axial direction of the combustor.

11 Claims, 6 Drawing Sheets

(56) References Cited

U.S. PATENT DOCUMENTS

| | | | | |
|---|---|---|---|---|
| 4,019,319 A * | 4/1977 | Oda | F02K 9/62 | 60/258 |
| 4,045,956 A * | 9/1977 | Markowski | F23R 3/30 | 431/352 |
| 4,101,076 A * | 7/1978 | Bart | F02M 47/02 | 239/584 |
| 4,122,968 A * | 10/1978 | Germain | B60K 15/04 | 138/114 |
| 4,250,857 A * | 2/1981 | Taplin | F02M 45/00 | 123/448 |
| 4,258,544 A * | 3/1981 | Gebhart | F02C 7/222 | 60/742 |
| 4,288,980 A * | 9/1981 | Ernst | F23R 3/002 | 60/39.23 |
| 4,342,198 A * | 8/1982 | Willis | F23D 17/002 | 239/400 |
| 4,362,184 A * | 12/1982 | Marabeas | F16K 15/026 | 137/516.29 |
| 4,409,791 A * | 10/1983 | Jourdain | F02C 7/222 | 60/240 |
| 4,584,834 A * | 4/1986 | Koshoffer | F23R 3/04 | 239/403 |
| 4,766,721 A * | 8/1988 | Iizuka | F02C 9/18 | 60/39.23 |
| 4,898,001 A * | 2/1990 | Kuroda | F23R 3/04 | 60/733 |
| 4,910,957 A * | 3/1990 | Moreno | F02C 3/14 | 60/737 |
| 4,918,925 A * | 4/1990 | Tingle | F02C 7/228 | 60/739 |
| 4,928,481 A * | 5/1990 | Joshi | F23R 3/346 | 60/737 |
| 4,955,191 A * | 9/1990 | Okamoto | F02C 3/30 | 60/39.3 |
| 4,974,571 A * | 12/1990 | Oppenheim | F02M 67/12 | 123/1 A |
| 5,010,852 A * | 4/1991 | Milisavljevic | F02B 69/06 | 123/21 |
| 5,054,280 A * | 10/1991 | Ishibashi | F23R 3/34 | 60/733 |
| 5,063,745 A * | 11/1991 | Shekleton | F23R 3/28 | 60/737 |
| 5,069,029 A * | 12/1991 | Kuroda | F23R 3/346 | 60/733 |
| 5,081,843 A * | 1/1992 | Ishibashi | F23R 3/26 | 60/733 |
| 5,127,221 A * | 7/1992 | Beebe | F23R 3/34 | 60/733 |
| 5,242,117 A * | 9/1993 | D'Agostino | F23R 3/14 | 137/110 |
| 5,253,474 A * | 10/1993 | Correa | F23R 3/42 | 60/740 |
| 5,265,425 A * | 11/1993 | Howell | F23R 3/14 | 60/736 |
| 5,275,337 A * | 1/1994 | Kolarik | F02M 57/02 | 137/853 |
| 5,307,635 A * | 5/1994 | Graves | F23D 11/38 | 239/397.5 |
| 5,311,742 A * | 5/1994 | Izumi | F23R 3/34 | 60/742 |
| 5,318,329 A * | 6/1994 | Suzuki | F01N 13/1816 | 285/114 |
| 5,319,919 A * | 6/1994 | Nakayama | F23R 3/34 | 60/39.091 |
| 5,361,578 A * | 11/1994 | Donlan | F02C 3/30 | 60/39.55 |
| 5,398,875 A * | 3/1995 | Sverdlin | F02M 57/02 | 239/533.8 |
| 5,402,634 A * | 4/1995 | Marshall | F02C 7/232 | 60/734 |
| 5,406,799 A * | 4/1995 | Marshall | F23R 3/50 | 60/747 |
| 5,415,000 A * | 5/1995 | Mumford | F23R 3/60 | 60/740 |
| 5,417,057 A * | 5/1995 | Robey | F02K 7/12 | 60/269 |
| 5,437,479 A * | 8/1995 | Hartling | F01N 13/1816 | 285/226 |
| 5,450,725 A * | 9/1995 | Takahara | F23R 3/286 | 60/737 |
| 5,471,831 A * | 12/1995 | Rowe | F01D 17/08 | 60/39.091 |
| 5,475,979 A * | 12/1995 | Oag | F23C 6/047 | 60/737 |
| 5,605,287 A * | 2/1997 | Mains | F23D 11/107 | 137/505.25 |
| 5,607,106 A * | 3/1997 | Bentz | F02M 57/024 | 239/533.3 |
| 5,630,320 A * | 5/1997 | Matsuda | F23R 3/18 | 60/749 |
| 5,640,851 A * | 6/1997 | Toon | F23R 3/26 | 60/737 |
| 5,647,215 A * | 7/1997 | Sharifi | F23D 17/002 | 239/431 |
| 5,660,045 A * | 8/1997 | Ito | F23D 23/00 | 60/737 |
| 5,732,730 A * | 3/1998 | Shoemaker | F02C 7/232 | 137/115.14 |
| 5,749,219 A * | 5/1998 | DuBell | F02C 7/26 | 60/733 |
| 5,797,267 A * | 8/1998 | Richards | F23R 3/346 | 60/737 |
| 5,802,854 A * | 9/1998 | Maeda | F23R 3/346 | 60/39.821 |
| 5,829,244 A * | 11/1998 | Ciccia | F23R 3/26 | 60/39.23 |
| 5,966,926 A * | 10/1999 | Shekleton | F02C 7/232 | 60/39.094 |
| 6,000,212 A * | 12/1999 | Kolaczkowski | F23C 13/00 | 431/7 |
| 6,102,303 A * | 8/2000 | Bright | F02M 51/005 | 137/341 |
| 6,109,661 A * | 8/2000 | Cwik | F01N 13/1816 | 285/299 |
| 6,148,604 A * | 11/2000 | Salt | F01D 9/023 | 60/39.37 |
| 6,199,367 B1 * | 3/2001 | Howell | F23D 11/24 | 239/402.5 |
| 6,253,555 B1 * | 7/2001 | Willis | F23C 7/004 | 60/733 |
| 6,263,663 B1 * | 7/2001 | Grienche | F23R 3/346 | 60/794 |
| 6,276,141 B1 * | 8/2001 | Pelletier | F23D 11/107 | 60/740 |
| 6,296,282 B1 * | 10/2001 | Burkhardt | F01N 13/1816 | 285/226 |
| 6,351,948 B1 * | 3/2002 | Goeddeke | F23D 11/24 | 60/740 |
| 6,412,282 B1 * | 7/2002 | Willis | F23C 6/047 | 60/737 |
| 6,427,446 B1 * | 8/2002 | Kraft | F23R 3/06 | 60/737 |
| 6,531,712 B1 * | 3/2003 | Boecking | F02M 57/02 | 251/129.06 |
| 6,585,171 B1 * | 7/2003 | Boecking | F02M 51/0603 | 239/102.1 |
| 6,871,503 B1 * | 3/2005 | Inoue | F23R 3/12 | 60/737 |
| 7,225,790 B2 * | 6/2007 | Bartunek | F02M 51/0603 | 123/294 |
| 7,255,290 B2 * | 8/2007 | Bright | F02M 47/027 | 239/102.1 |
| 7,850,091 B2 * | 12/2010 | Boecking | F02M 51/0603 | 123/472 |
| 7,941,995 B2 * | 5/2011 | Goss | B01F 3/04049 | 60/295 |
| 8,122,721 B2 * | 2/2012 | Johnson | F23D 14/48 | 60/737 |

(56) References Cited

U.S. PATENT DOCUMENTS

| | | | | |
|---|---|---|---|---|
| 8,172,566 B2* | 5/2012 | Watson | F23D 11/102 | 239/432 |
| 8,407,892 B2* | 4/2013 | DiCintio | F23R 3/06 | 29/889 |
| 8,484,978 B2* | 7/2013 | Bailey | F01D 25/28 | 60/737 |
| 8,763,362 B1* | 7/2014 | Trinh | F02K 9/52 | 239/87 |
| 8,904,796 B2* | 12/2014 | Singh | F23R 3/045 | 60/733 |
| 8,919,137 B2* | 12/2014 | DiCintio | F23R 3/045 | 60/733 |
| 9,010,120 B2* | 4/2015 | DiCintio | F23R 3/06 | 60/746 |
| 9,079,273 B2* | 7/2015 | Arellano | F02C 7/22 | |
| 9,091,238 B2* | 7/2015 | McAlister | F02M 51/0603 | |
| 9,200,571 B2* | 12/2015 | Bailey | F02C 7/22 | |
| 9,212,823 B2* | 12/2015 | Boardman | F23R 3/286 | |
| 9,243,507 B2* | 1/2016 | Stoia | F01D 9/023 | |
| 9,310,078 B2* | 4/2016 | Chen | F23R 3/045 | |
| 9,316,155 B2* | 4/2016 | DiCintio | F02C 7/222 | |
| 9,400,114 B2* | 7/2016 | Melton | F23R 3/60 | |
| 9,435,541 B2* | 9/2016 | Davis, Jr. | F23R 3/346 | |
| 9,482,434 B2* | 11/2016 | Davis, Jr. | F23R 3/346 | |
| 9,593,851 B2* | 3/2017 | Shershnyov | F23D 11/408 | |
| 2002/0020173 A1* | 2/2002 | Varney | F23C 6/047 | 60/737 |
| 2002/0117226 A1* | 8/2002 | Malcarne, Jr. | F16L 11/115 | 138/121 |
| 2002/0145284 A1* | 10/2002 | Powell | F16L 25/0036 | 285/353 |
| 2002/0162900 A1* | 11/2002 | Boecking | F02M 47/027 | 239/102.2 |
| 2003/0213463 A1* | 11/2003 | Coleman | F01L 13/0015 | 123/305 |
| 2004/0011058 A1* | 1/2004 | Baudoin | F23R 3/007 | 60/804 |
| 2005/0229901 A1* | 10/2005 | Weber | F01L 9/02 | 123/316 |
| 2005/0235953 A1* | 10/2005 | Weber | F01N 3/035 | 123/316 |
| 2005/0241302 A1* | 11/2005 | Weber | F01L 13/0015 | 60/311 |
| 2005/0241611 A1* | 11/2005 | Weber | F01L 1/181 | 123/299 |
| 2005/0247284 A1* | 11/2005 | Weber | F01L 13/0015 | 123/299 |
| 2005/0247286 A1* | 11/2005 | Weber | F01L 9/02 | 123/316 |
| 2006/0071094 A1* | 4/2006 | Ehresman | F02M 57/023 | 239/88 |
| 2006/0107667 A1* | 5/2006 | Haynes | F23R 3/286 | 60/776 |
| 2006/0108452 A1* | 5/2006 | Anzinger | F02M 61/08 | 239/533.7 |
| 2009/0173810 A1* | 7/2009 | Rodrigues | F02C 7/232 | 239/533.3 |
| 2009/0218421 A1* | 9/2009 | Kumaravelu | F23D 11/38 | 239/588 |
| 2010/0018210 A1* | 1/2010 | Fox | F23R 3/16 | 60/746 |
| 2010/0037615 A1* | 2/2010 | Williams | F16K 15/186 | 60/741 |
| 2010/0050645 A1* | 3/2010 | Haggerty | F02C 7/222 | 60/739 |
| 2010/0051728 A1* | 3/2010 | Hicks | F23D 11/38 | 239/597 |
| 2010/0071376 A1* | 3/2010 | Wiebe | F23R 3/002 | 60/740 |
| 2010/0071377 A1* | 3/2010 | Fox | F23R 3/16 | 60/740 |
| 2010/0115966 A1* | 5/2010 | Nagai | F02C 7/222 | 60/800 |
| 2010/0162710 A1* | 7/2010 | Senior | F23R 3/34 | 60/737 |
| 2010/0170219 A1* | 7/2010 | Venkataraman | F02C 7/228 | 60/39.281 |
| 2010/0170251 A1* | 7/2010 | Davis, Jr. | F02C 7/228 | 60/740 |
| 2010/0170252 A1* | 7/2010 | Venkataraman | F02C 3/20 | 60/742 |
| 2010/0170254 A1* | 7/2010 | Venkataraman | F23R 3/346 | 60/746 |
| 2010/0174466 A1* | 7/2010 | Davis, Jr. | F02C 7/22 | 701/100 |
| 2010/0251720 A1* | 10/2010 | Pelletier | F23D 11/107 | 60/740 |
| 2010/0323309 A1* | 12/2010 | Barkowski | F23R 3/286 | 431/8 |
| 2011/0056206 A1* | 3/2011 | Wiebe | F23D 11/36 | 60/740 |
| 2011/0067402 A1* | 3/2011 | Wiebe | F23R 3/08 | 60/740 |
| 2011/0094239 A1* | 4/2011 | Koizumi | F23R 3/346 | 60/776 |
| 2011/0108639 A1* | 5/2011 | Hicks | F23D 11/26 | 239/533.9 |
| 2011/0289928 A1* | 12/2011 | Fox | F23R 3/286 | 60/740 |
| 2011/0296839 A1* | 12/2011 | Van Nieuwenhuizen | F23R 3/346 | 60/737 |
| 2012/0073299 A1* | 3/2012 | Bleeker | F02C 7/222 | 60/740 |
| 2012/0102958 A1* | 5/2012 | Stoia | F02C 7/22 | 60/740 |
| 2012/0131924 A1* | 5/2012 | Yoshida | F23R 3/343 | 60/772 |
| 2012/0227389 A1* | 9/2012 | Hinderks | F01B 1/10 | 60/317 |
| 2012/0304648 A1* | 12/2012 | Byrne | F23R 3/06 | 60/737 |
| 2013/0167542 A1* | 7/2013 | Stoia | F23R 3/286 | 60/738 |
| 2013/0167547 A1* | 7/2013 | Stoia | F23R 3/26 | 60/772 |
| 2013/0174558 A1* | 7/2013 | Stryapunin | F23R 3/286 | 60/734 |
| 2013/0263602 A1* | 10/2013 | Bleeker | F02C 7/24 | 60/739 |
| 2013/0283807 A1* | 10/2013 | Stoia | F23R 3/346 | 60/772 |
| 2014/0090391 A1* | 4/2014 | Burd | F23R 3/346 | 60/772 |
| 2014/0245740 A1* | 9/2014 | Wiebe | F02C 7/222 | 60/740 |
| 2014/0260258 A1* | 9/2014 | Melton | F23R 3/26 | 60/733 |
| 2014/0260265 A1* | 9/2014 | Beck | F23R 3/286 | 60/734 |
| 2014/0260272 A1* | 9/2014 | DiCintio | F02C 7/222 | 60/739 |
| 2014/0260273 A1* | 9/2014 | Melton | F23R 3/002 | 60/739 |
| 2014/0260275 A1* | 9/2014 | Melton | F23R 3/20 | 60/740 |
| 2014/0260277 A1* | 9/2014 | DiCintio | F23R 3/005 | 60/746 |
| 2014/0260319 A1* | 9/2014 | Melton | F23R 3/60 | 60/796 |
| 2014/0305521 A1* | 10/2014 | Burke | F23N 1/007 | 137/512 |
| 2014/0338342 A1* | 11/2014 | Graham | F23R 3/28 | 60/740 |
| 2014/0352312 A1* | 12/2014 | Beck | F23R 3/346 | 60/737 |

(56) References Cited

U.S. PATENT DOCUMENTS

| | | | |
|---|---|---|---|
| 2014/0366553 A1* | 12/2014 | Beck | F23R 3/286 |
| | | | 60/779 |
| 2015/0007572 A1* | 1/2015 | Pousseo | F02C 7/232 |
| | | | 60/740 |
| 2015/0027126 A1* | 1/2015 | Berry | F02C 7/222 |
| | | | 60/739 |
| 2015/0059348 A1* | 3/2015 | Toronto | F02C 7/228 |
| | | | 60/772 |
| 2015/0159877 A1* | 6/2015 | Stoia | F02C 7/222 |
| | | | 60/735 |
| 2015/0260407 A1* | 9/2015 | Crothers | F23R 3/346 |
| | | | 60/776 |
| 2015/0275755 A1* | 10/2015 | Ogata | F02C 3/22 |
| | | | 60/39.463 |
| 2015/0276226 A1* | 10/2015 | Laster | F23R 3/346 |
| | | | 60/731 |
| 2015/0285501 A1* | 10/2015 | DiCintio | F23R 3/14 |
| | | | 60/740 |
| 2015/0315969 A1* | 11/2015 | Fisher | F02C 7/222 |
| | | | 60/739 |
| 2015/0345402 A1* | 12/2015 | Crothers | F23N 1/022 |
| | | | 60/776 |
| 2015/0361897 A1* | 12/2015 | Steele | F23R 3/283 |
| | | | 60/739 |
| 2016/0215891 A1* | 7/2016 | Thomson | F16K 1/34 |
| 2016/0258629 A1* | 9/2016 | Slobodyanskiy | F23R 3/286 |
| 2016/0265781 A1* | 9/2016 | Carnell, Jr. | F23R 3/002 |
| 2016/0265782 A1* | 9/2016 | Bhagat | F23R 3/002 |

* cited by examiner

FUEL DELIVERY SYSTEM WITH MOVEABLY ATTACHED FUEL TUBE

FIELD OF THE INVENTION

The present disclosure generally relates to a combustor for a gas turbine, or more particularly to a fuel delivery system for a downstream injector in a combustor for a gas turbine.

BACKGROUND OF THE INVENTION

Turbines are widely used in industrial and commercial operations. A combustion section of a gas turbine generally includes a plurality of combustors that are arranged in an annular array around an outer casing such as a compressor discharge casing. Pressurized air flows from a compressor to the compressor discharge casing and is routed to each combustor. Fuel from a fuel nozzle is mixed with the pressurized air in each combustor to form a combustible mixture within a primary combustion zone of the combustor. The combustible mixture is burned to produce hot combustion gases having a high pressure and high velocity.

In a typical combustor, the combustion gases are routed towards an inlet of a turbine of the gas turbine through a hot gas path that is at least partially defined by an annular combustion liner and an annular transition duct that extends downstream from the combustion liner and terminates at the inlet to the turbine. Thermal and kinetic energy are transferred from the combustion gases to the turbine to cause the turbine to rotate, thereby producing mechanical work. For example, the turbine may be coupled to a shaft that drives a generator to produce electricity.

In particular combustors, a downstream combustion module is utilized to inject a generally lean fuel-air mixture into the hot gas path downstream from the primary combustion zone. The combustion module generally includes an annular fuel distribution manifold and a fuel injection assembly. The fuel distribution manifold circumferentially surrounds a portion of a cap assembly that partially surrounds the fuel nozzle. The annular fuel distribution manifold may mount the combustor to the compressor discharge casing, creating a high pressure plenum surrounding at least a portion of the respective combustor. Additionally, the annular fuel distribution manifold includes a plurality of fuel outlets on an aft side in the high pressure plenum.

The fuel injection assembly of the downstream combustion module includes a plurality of radially extending fuel injectors, also known as late lean fuel injectors, that inject a lean fuel-air combustible mixture into the hot gas path downstream from the primary combustion zone. As a result of the late lean fuel injectors, the combustion gas temperature is increased and the thermodynamic efficiency of the combustor is improved without producing a corresponding increase in the production of undesirable emissions such as oxides of nitrogen ($NO_x$).

The downstream combustion module additionally includes fuel lines extending from the late lean fuel injectors to the fuel outlets in the annular fuel distribution manifold. Due to variations in thermal conditions during operation of the gas turbine, the fuel lines may expand or contract during operation of the gas turbine. Accordingly, present fuel lines may generally include a plurality of segments and respective connection points aft of the fuel distribution manifold, in the high pressure plenum, to accommodate the expansion and contraction. However, certain problems may exist with such a configuration. For example, the segmented construction may add to the complexity during installation of the fuel lines. Additionally, the fuel connections may allow an opportunity for fuel leakage in the connections aft of the fuel distribution manifold. Accordingly, a fuel delivery system that could deliver fuel to the late lean injectors without requiring the fuel lines to be segmented would be beneficial.

BRIEF DESCRIPTION OF THE INVENTION

Aspects and advantages of the invention are set forth below in the following description, or may be obvious from the description, or may be learned through practice of the invention.

In one exemplary embodiment, a combustor for a gas turbine is provided, the combustor defining an axial direction and including a mounting ring for mounting the combustor to a casing of the gas turbine. The combustor also includes an injector positioned aft of the mounting ring along the axial direction for injecting a fuel into a hot gas path of the combustor. Additionally, the combustor includes a fuel tube extending from the injector towards the mounting ring and an attachment assembly. The fuel tube is moveably attached to the mounting ring using the attachment assembly to accommodate a thermal expansion or contraction of the fuel tube along the axial direction.

In another exemplary embodiment, a gas turbine is provided. The gas turbine comprises a compressor portion, a combustor assembly in communication with the compressor portion, and a turbine portion in communication with the combustor assembly. The combustor assembly includes a combustor, the combustor defining an axial direction and including a mounting ring for mounting the combustor to a casing of the gas turbine. The combustor also includes an injector positioned aft of the mounting ring along the axial direction for injecting a fuel into a hot gas path of the combustor. Additionally, the combustor includes a fuel tube extending continuously from the injector towards the mounting ring and an attachment assembly. The fuel tube is moveably attached to the mounting ring using the attachment assembly to accommodate a thermal expansion or contraction of the fuel tube along the axial direction.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
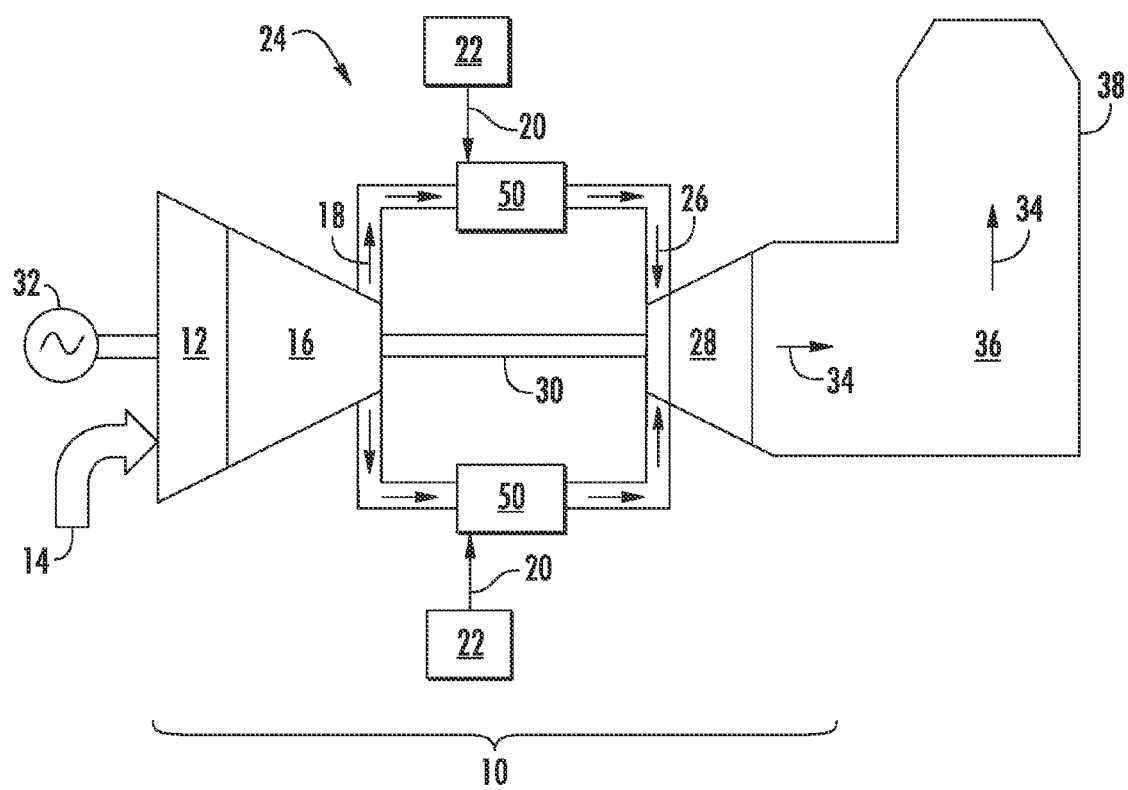
FIG. 1 is a functional block diagram of a gas turbine in accordance with an exemplary embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. Additionally, the terms "upstream" and "downstream" refer to the relative direction with respect to fluid flow in a fluid pathway. For example, "upstream" refers to the direction from which the fluid flows, and "downstream" refers to the direction to which the fluid flows. Similarly, "forward" refers generally to an upstream direction in the gas turbine, or an upstream portion of the gas turbine, while "aft" refers generally to a downstream direction in the gas turbine, or a downstream portion of the gas turbine. Moreover, the term "radially" refers to the relative direction that is substantially perpendicular to an axial centerline of a particular component, and the term "axially" refers to the relative direction that is substantially parallel to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a combustor incorporated into a gas turbine for purposes of illustration, it should be readily appreciated from the teachings herein that embodiments of the present invention may be applied to any combustor incorporated into any turbomachine and is not limited to a gas turbine combustor unless specifically recited in the claims.

Certain exemplary embodiments of the present disclosure include a fuel delivery system for a gas turbine combustor. The exemplary fuel delivery system includes a fuel tube and an attachment assembly. The fuel tube extends from a downstream injector (e.g., a late lean injector) towards a mounting ring of the combustor and is moveably attached to the mounting ring using the attachment assembly. Accordingly, the exemplary fuel delivery system may provide fuel to a downstream injector while accommodating a thermal expansion or contraction of the fuel tube along an axial direction of the combustor.

Referring now to the drawings, wherein identical numerals indicate the same elements throughout the figures, FIG. 1 provides a functional block diagram of an exemplary gas turbine 10 that may incorporate various embodiments of the present invention. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor portion where a compressor 16 progressively imparts kinetic energy to the working fluid 14 to produce a compressed working fluid 18 at a highly energized state.

The compressed working fluid 18 is mixed with a fuel 20 from a fuel supply 22 to form a combustible mixture within one or more combustors 50 within a combustor assembly 24. The combustible mixture is burned to produce combustion gases 26 having a high temperature and pressure. The combustion gases 26 flow through a turbine 28 of a turbine section to produce work. For example, the turbine 28 may be connected to a shaft 30 so that rotation of the turbine 28 drives the compressor 16 to produce the compressed working fluid 18. Alternatively, or additionally, the shaft 30 may connect the turbine 28 to a generator 32 for producing electricity. Exhaust gases 34 from the turbine 28 flow through an exhaust section 36 that connects the turbine 28 to an exhaust stack 38 downstream from the turbine 28. The exhaust section 36 may include, for example, a heat recovery steam generator (not shown) for cleaning and extracting additional heat from the exhaust gases 34 prior to release to the environment.

Figure 2:
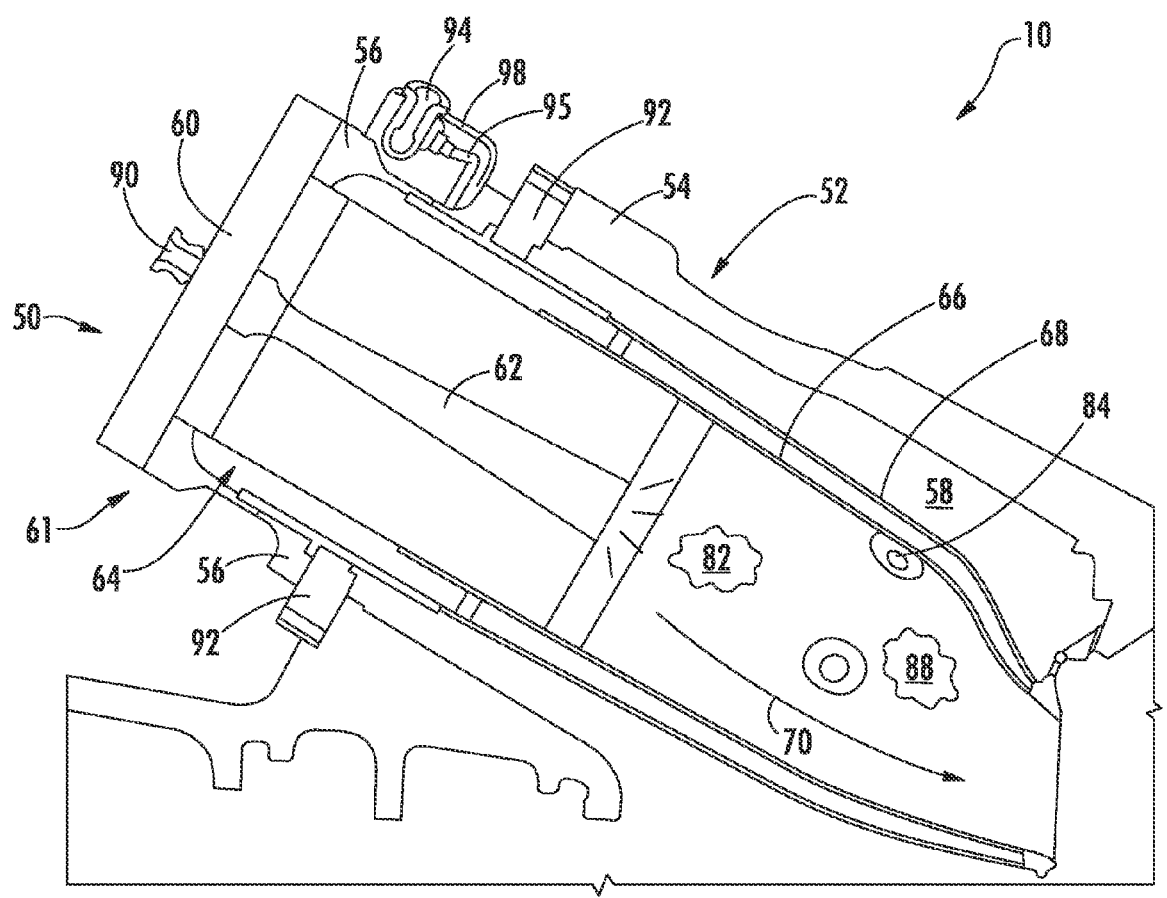
FIG. 2 is a cross-sectional side view of a portion of an exemplary gas turbine, including a combustor in accordance with an exemplary embodiment of the present invention.
Figure 3:
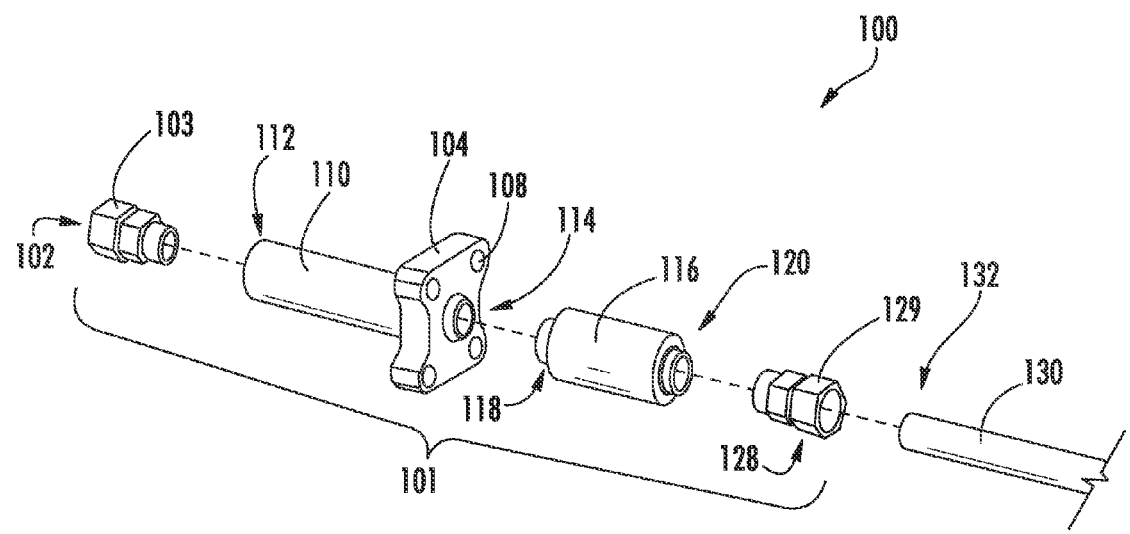
FIG. 3 is an exploded perspective view of a fuel delivery system in accordance with an exemplary embodiment of the present disclosure.
Figure 4:
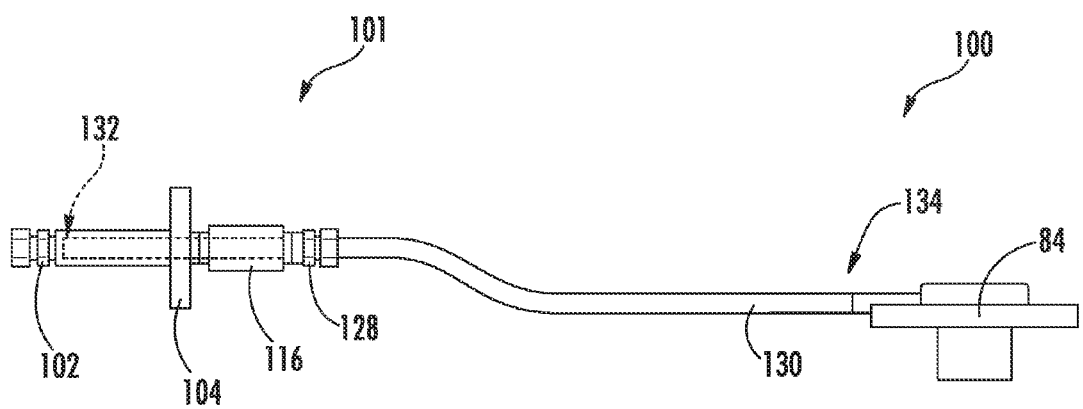
FIG. 4 is a side view of the exemplary fuel delivery system of FIG. 3.

Referring now to FIG. 2, a cross-sectional side view is provided of a portion of an exemplary gas turbine 10 including an exemplary combustor 50. As shown, the combustor 50 is at least partially surrounded by an outer casing 52, such as a compressor discharge casing 54, that is disposed downstream from the compressor 16. The outer casing 52 is in fluid communication with the compressor 16 and at least partially defines a high pressure plenum 58 that surrounds at least a portion of the combustor 50. An end cover 60 is coupled to a forward casing 56 of the combustor 50 at a forward end 61 of the combustor 50.

Figure 6:
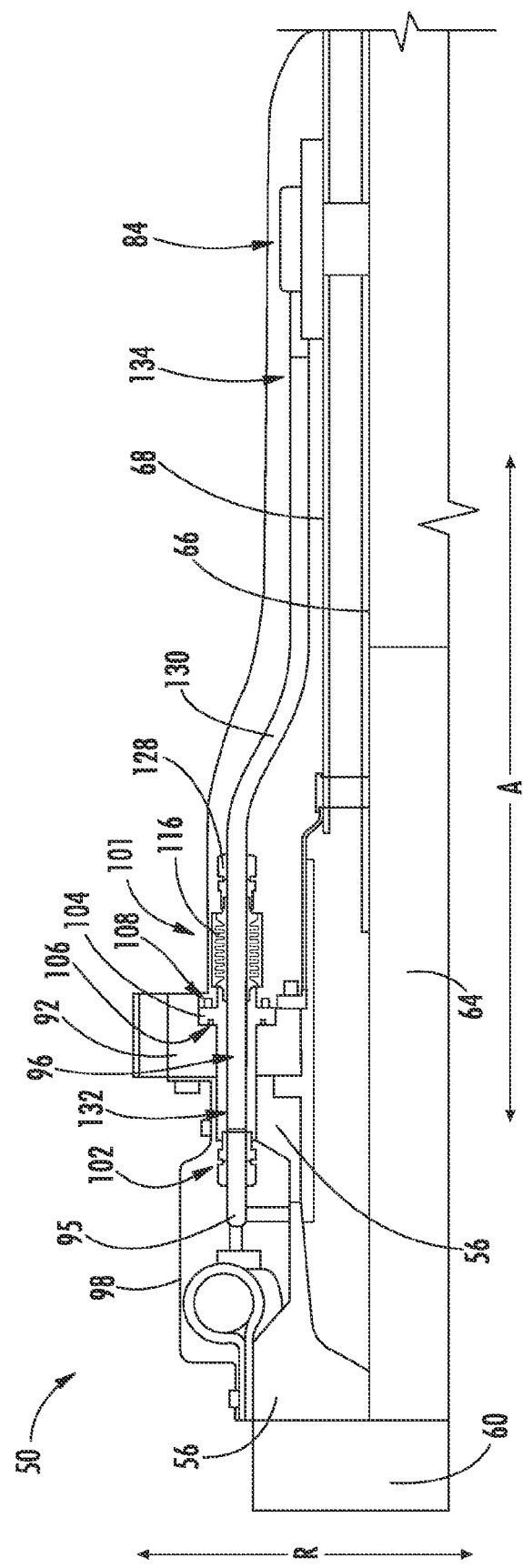
FIG. 6 is cross-sectional side view of the exemplary fuel delivery system of FIG. 3 installed in a combustor of a gas turbine in accordance with an exemplary embodiment of the present disclosure.

As shown in FIG. 2, the combustor 50 generally includes at least one fuel nozzle 62 positioned downstream from the end cover 60, extending along an axial direction A of the combustor 50 (see FIG. 6). An annular cap assembly 64 is also included, extending radially and axially within the outer casing 52 downstream from the end cover 60. Additionally, an annular hot gas path duct or combustion liner 66 extends downstream from the cap assembly 64 and an annular flow sleeve 68 surrounds at least a portion of the combustion liner 66. The combustion liner 66 defines a hot gas path 70 for routing the combustion gases 26 through the combustor 50 and towards the turbine 28 (see FIG. 1).

Further, the exemplary combustor 50 includes a main fuel flange 90 for delivering fuel 20 from the fuel source 22 (see FIG. 1) to the one or more axially extending fuel nozzle(s) 62. The axially extending fuel nozzle(s) 62 extend at least partially through the cap assembly 64 to provide a first combustible mixture that consists primarily of the fuel 20 and a portion of the compressed working fluid 18 from the compressor 16 to a primary combustion zone 82 that is defined within the combustion liner 66 downstream from the cap assembly 64.

Additionally, a mounting ring 92 is provided for mounting the combustor 50 to the outer casing 52 of the gas turbine 10. For the exemplary embodiment of FIG. 2, the mounting ring 92 is an annular mounting flange (similar to what has been referred to in prior art embodiments as a "fuel distribution manifold") attached on a forward side to the forward casing 56 of the combustor 50, and on an aft side to the outer casing 52 of the gas turbine 10. It should be appreciated, however, that in other exemplary embodiments of the present disclosure, the mounting ring 92 may instead, or in combination, be an extension of the forward casing 56 of the combustor 50 or any other attachment to the forward casing 56 of the combustor 50.

Referring still to FIG. 2, the combustor 50 further includes one or more downstream fuel injectors 84, also known as late-lean fuel injectors, that extend through the flow sleeve 68 and the combustion liner 66 at a point that is downstream from the axially extending fuel nozzle(s) 62 and downstream from, or aft of, the mounting ring 92. In such an exemplary embodiment, the combustion liner 66 further defines a secondary combustion zone 88 that is proximate to the fuel injector(s) 84 and downstream from the primary combustion zone 82. Additionally, for the exemplary embodiment of FIG. 2, a secondary fuel flange 94, or late-lean injector fuel flange, is included, positioned forward of the mounting ring 92, for providing fuel 20 from the fuel source 22 (see FIG. 1). Further, a manifold cover 98 is provided, attached to the forward casing 56 and extending at least partially around the secondary fuel flange 94. As will be discussed below with reference to FIGS. 3-6, a fuel delivery system 100 may be included to deliver fuel from the secondary fuel flange 94 to the downstream injector(s) 84 through the mounting ring 92.

It should be appreciated, however, that the exemplary combustor 50 and gas turbine 10 described herein with reference to FIGS. 1 and 2 are by way of example only, and may in other exemplary embodiments have any other suitable configuration. For example, although the combustion liner 66 and flow sleeve 68 are each depicted in FIG. 2 as single units, in other embodiments, the combustion liner 66 and/or the flow sleeve 68 may instead be comprised of two or more portions joined together in any suitable manner. Additionally, in other exemplary embodiments, the combustor 50 and/or the gas turbine 10 may include any suitable configuration of fuel flange(s) 90, secondary fuel flange(s) 94, nozzle(s) 62, forward casing 56, outer casing 52 etc.

Referring now to FIGS. 3-6, an exemplary fuel delivery system 100 is provided for delivering fuel 20 from the secondary fuel flange 94, forward of the mounting ring 92, to one or more of the downstream fuel injectors 84, aft of the mounting ring 92. The exemplary fuel delivery system 100 generally includes a fuel tube 130 extending from the injector 84 toward the mounting ring 92 (see FIG. 6). The fuel tube 130 is moveably attached to the mounting ring 92 using an attachment assembly 101. Such a construction may allow the exemplary fuel delivery system 100, including, e.g., the fuel tube 130, to accommodate thermal expansion or contraction along the axial direction A of the combustor 50 during operation of the gas turbine 10.

As shown, the fuel tube 130 extends continuously between an aft end 134 and a forward end 132, and is attached at the aft end 134 to the injection 84. The fuel tube 130 may be attached at the aft end 134 to the injector 84 in any suitable manner. For example, the aft end 134 may be welded directly to the injector 84 or, alternatively, may be attached using an intermediate connection member. Proximate to the forward end 132, the fuel tube 130 is moveably attached to the mounting ring 92 using the attachment assembly 101. The exemplary attachment assembly 101 of FIGS. 3-6 generally includes an aft tube fitting 128, a bellows assembly 116, a flange 104, and a forward tube fitting 102. The forward end 132 of the fuel tube 130 extends through the aft tube fitting 128, through the bellows assembly 116, and through the flange 104.

The bellows assembly 116 defines a first end 118 and a second end 120, which for the exemplary embodiment of FIGS. 3-6, correspond to a forward end and an aft end, respectively. The bellows assembly 116 is attached at the second end 120 to the fuel tube 130 using the aft tube fitting 128. The exemplary aft tube fitting 128 of FIGS. 3-6 is attached to the fuel tube 130 using a friction fit portion 129 and to the second end 120 of the bellows assembly 116 using a threaded screw connection. Similarly, the bellows assembly 116 is attached at the first end 118 to the mounting ring 92 using the flange 104. More particularly, the first end 118 of the bellows assembly 116 attaches to an aft end 114 of the flange 104 using a threaded screw connection. The flange 104 in turn includes a plurality of attachment points 108 for attaching the flange 104 to the mounting ring 92. Additionally, for the exemplary embodiment of FIGS. 3-6, the flange 104 includes a seal groove 106 for positioning an appropriate seal member (not shown) between the flange 104 and mounting ring 92 to further ensure a proper seal is created between the flange 104 and the mounting ring 92.

It should be appreciated, however, that although the exemplary bellows assembly 116 is depicted in FIGS. 3-6 as being attached to the flange 104 and aft tube fitting 128 using threaded screw connections, in other exemplary embodiments, any other suitable connection means may be provided. For example, the bellows assembly 116 may be attached to the flange 104 and/or the aft tube fitting 128 permanently (e.g., by welding or being made integrally with each other) or removably (e.g., by using a quick-release connection, bolted on connection, compression fit connection, friction fit connection, or any other suitable connection). Additionally, in other exemplary embodiments, any other suitable means may be provided for attaching the tube fitting 128 to the fuel tube 130 or for attaching the flange 104 to the mounting ring 92. For example, in other exemplary embodiments, the flange 104 may be made integrally with the mounting ring 92.

Figure 5:
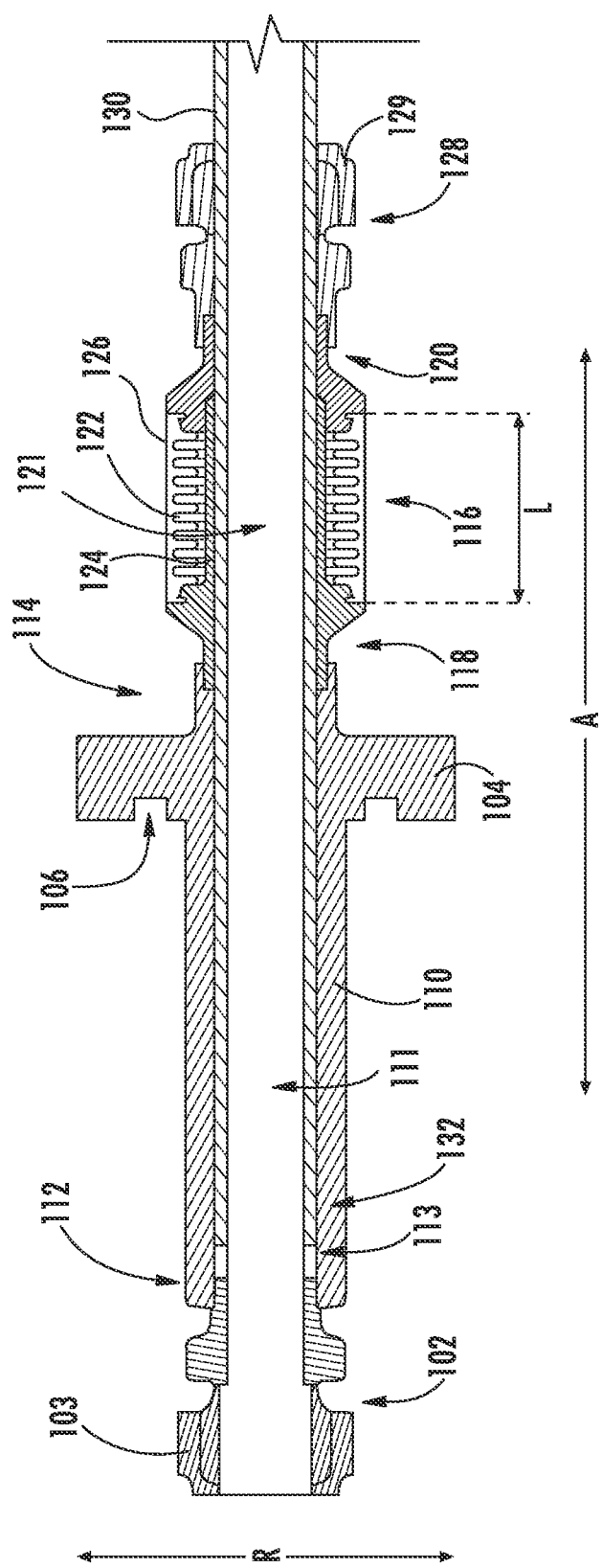
FIG. 5 is a cross-sectional side view of a portion of the exemplary fuel delivery system of FIG. 3.

Referring specifically to FIG. 5, the exemplary bellows assembly 116 additionally defines an axial length L and includes a plurality of annular bellows 122 positioned radially between an inner liner 124 and an external liner 126. The inner liner 124 defines an internal channel 121 having a cross-sectional shape along a radial direction R that is complementary to a cross-sectional shape along the radial direction R of the fuel tube 130. The bellows 122 provide the bellows assembly 116 with flexibility, while the inner liner 124 and/or the external liner 126 allow for a substantially consistent cross-sectional shape along the radial direction R. More particularly, the bellows assembly 116 allows for the axial length L of the assembly 116 to increase or decrease while maintaining connections at the first and second ends 118, 120 and a substantially consistent cross-sectional shape along the radial direction R. For example, the axial length L of the bellows assembly 116 may, in certain exemplary embodiments be designed to expand or retract more than about 2%, more than about 5%, more than about 7%, or more from a resting axial length L. Alternatively, however, in other exemplary embodiments, the bellows assembly may be designed to expand or contract less than about 2% from a resting axial length L. Accordingly, the axial length L of the bellows assembly 116 is a variable length.

With continued reference to FIG. 5, the exemplary flange 104 includes a cylindrical extension 110 defining an internal channel 111 corresponding to the shape of the fuel tube 130. The fuel tube 130 may extend into the internal channel 111 of the extension 110, such that the forward end 132 of the fuel tube is proximate to a forward end 112 of the cylindrical extension 110 of the flange 104.

For the exemplary embodiment shown, the forward end 112 of the cylindrical extension 110 is attached to a forward tube fitting 102 using a threaded screw connection. The forward tube fitting 102 may then connect to the secondary fuel flange 94 directly or via a connecting fuel tube 95 (see FIG. 6) using a friction fit portion 103. The exemplary system 100 is constructed such that a gap 113 along the axial direction A is present between the forward end 132 of the fuel tube 130 and the forward tube fitting 102 to allow for the expansion and contraction of the fuel tube 130. It should be appreciated, however, that in other exemplary embodiments of the present disclosure, the flange 104 may be completely lacking of an extension 110, and the forward tube fitting 102 may instead attach directly to the fuel tube 130 forward of the flange 104.

Referring now specifically to the cross-sectional view of FIG. 6, the exemplary fuel delivery system 100 is depicted installed in the exemplary combustor 50. As stated above, the mounting ring 92 attaches the combustor 50 to the outer casing 52 of the gas turbine 10, creating a seal allowing for the high pressure plenum 58 surrounding at least a portion of the combustor 50. Fuel 20 is delivered by the fuel delivery system 100 to the downstream fuel injector 84 from a secondary fuel flange 94 (see FIG. 2). The fuel delivery system 100 extends through a through hole 96 defined by the mounting ring 92. The through hole 96 extends generally along the axial direction A through the mounting ring 92. As used herein, "generally along the axial direction" refers to any direction extending from a forward side of the mounting ring 92 to an aft side of the mounting ring 92, and is not limited to a hole extending directly from one side to the other.

The secondary fuel flange 94 is fluidly connected to the forward end 132 of the fuel tube 130 via the intermediate fuel line 95. As shown, the exemplary fuel tube 130 of FIG. 6 extends continuously from the aft end 134 (attached to the injector 84) into the through hole 96 of the mounting ring 92. The attachment assembly 101 moveably attaches, or more particularly, slidingly attaches the fuel tube 130 to the mounting ring 92 to accommodate a thermal expansion or contraction of the fuel tube 130 along the axial direction A. As stated, the attachment assembly 101 includes the bellows assembly 116, with the first end 118 attached to, and in a fixed position with respect to, the mounting ring 92 (via the flange 104). The second end 120 of the bellows assembly 116 is attached to the fuel tube 130 and is moveable along the axial direction A with respect to the mounting ring 92. Such a construction allows for the continuous extension (i.e., no connection points) of the fuel tube 130 from the injector 84 to the mounting ring 92. More particularly, for the exemplary embodiment of FIG. 6, the fuel tube 130 extends continuously from the injector 84 into and through the through hole 96 in the mounting ring 92 and is fluidly connected to the secondary fuel flange 94 forward of the mounting ring 92. The above configuration may decrease a risk of fuel leakage outside the combustor 50, aft of the mounting ring 92, by eliminating the need for connection points in the fuel tube 130 between the injector 84 and the mounting ring 92.

Figure 7:
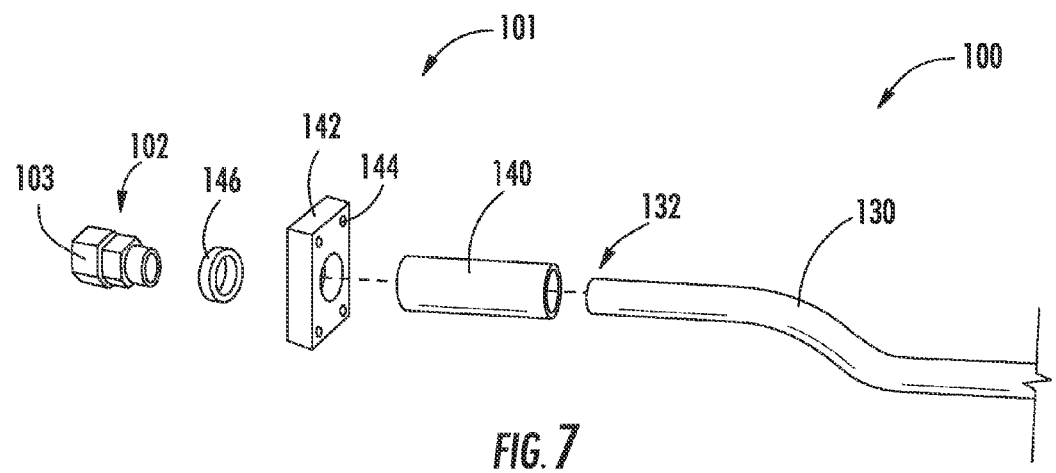
FIG. 7 is an exploded perspective view of a fuel delivery system in accordance with another exemplary embodiment of the present disclosure.
Figure 8:
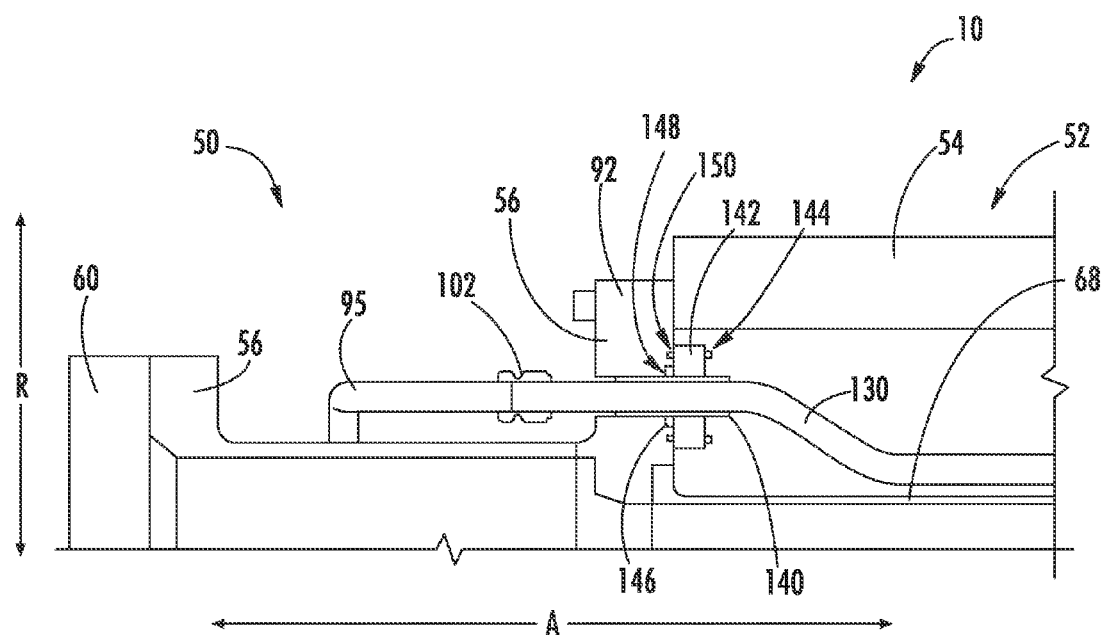
FIG. 8 is cross-sectional view of the exemplary fuel delivery system of FIG. 7 installed in a combustor of a gas turbine in accordance with an exemplary embodiment of the present disclosure.

Referring now to FIGS. 7 and 8, another exemplary embodiment of a fuel delivery system 100 of the present disclosure is provided. Similar to the exemplary system 100 of FIGS. 3-6, the exemplary system 100 of FIGS. 7 and 8 generally includes a fuel tube 130 extending from the injector 84 (not shown) towards the mounting ring 92 and an attachment assembly 101. The exemplary attachment assembly 101 of FIGS. 7 and 8 includes a cylindrical sleeve 140, a flange 142, and a sliding seal 146. As depicted, the cylindrical sleeve 140 extends around the fuel tube 130. The fuel tube 130 and at least a portion of the sleeve 140 extend through the flange 142 and sliding seal 146, and into the through hole 96 defined by the mounting ring 92. For the exemplary embodiment of FIGS. 7 and 8, the tube 130 further extends through the through hole 96 and attaches directly to the forward tube fitting 102.

The flange 142 is attached to an aft side of the mounting ring 92 using a plurality of attachment points 144 and defines an annular seal groove 150 configured to receive a seal member (not shown) to further effectuate a seal between the flange 142 and mounting ring 92. The sliding seal 146 is positioned in a correspondingly shaped groove 148 in the mounting ring 92, held in position by the flange 142. The flange 142 additionally acts to seal the sliding seal 146 to the mounting ring 92. The sliding seal 146 in turn provides for a seal with the sleeve 140 and/or the fuel tube 130 while still allowing the fuel tube 130 to move along the axial direction A relative to the mounting ring 92. The sliding seal 146 may be any seal suitable for maintaining a seal with the fuel tube and/or sleeve 140 while allowing for movement along the axial direction A. For example, the sliding seal 146 may be a lip seal. Accordingly, the fuel tube 130 is moveably attached to the mounting ring 92 using the attachment assembly 101 and the sliding seal 146. Such a configuration may allow the fuel tube 130 to extend continuously (i.e., without any intermediate connection points) from the injector 84 to and through mounting ring 92, or more particularly through the attachment assembly 101 and sliding seal 146. Accordingly, such a configuration may accommodate a thermal expansion or contraction of the fuel tube 130 during operation of the gas turbine 10, while still reducing a risk of fuel leakage outside of the combustor 50, aft of the mounting ring 92.

As depicted in FIGS. 7 and 8, the fuel tube 130 is attached to the secondary fuel flange 94 at the forward end 132 via an intermediate fuel line 95 and forward tube fitting 102. Additionally, for the exemplary embodiment of FIGS. 7 and 8, the mounting ring 92 is an extension of the forward casing 56 of the combustor 50.

It should be appreciated, however, that the exemplary embodiment of FIGS. 7 and 8 is provided by way of example only and that in other exemplary embodiments, the attachment assembly 101 may have any other suitable configuration. For example, in other exemplary embodiments, the attachment assembly 101 may not include the cylindrical sleeve 140, and instead the sliding seal 146 may slidingly attach directly to the fuel tube 130. Moreover, in other exemplary embodiments, the mounting ring 92 may define a depression for receipt of the flange 142 (or flange 104), such that the flange 142 (or flange 104) is counter-bored into the mounting ring 92.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed:

1. A combustor for a gas turbine, the combustor defining an axial direction and a forward end, the combustor comprising:
   a fuel nozzle extending from the forward end of the combustor for injecting a fuel into a primary combustion zone within a hot gas path of the combustor;
   a mounting ring for mounting the combustor to a casing of the gas turbine, the mounting ring positioned aft of the forward end of the combustor and defining a through hole;
   an injector positioned aft of the mounting ring along the axial direction for injecting a fuel into a secondary combustion zone within the hot gas path of the combustor located downstream of the primary combustion zone;
   a fuel tube extending from the injector towards the mounting ring; and
   an attachment assembly moveably attaching the fuel tube to the mounting ring such that the fuel tube is movable relative to the mounting ring to accommodate a thermal expansion or contraction of the fuel tube along the axial direction, the attachment assembly being a separate assembly from the fuel tube and including a bellows assembly, a fuel tube flange, and a tube fitting, the bellows assembly defining a variable length along the axial direction and extending between a first end and a second end, the bellows assembly attached to the mounting ring at the first end using the fuel tube flange and attached to the fuel tube at the second end using the tube fitting, the tube fitting extending through the through hole of the mounting ring.

2. The combustor of claim 1, wherein the fuel tube extends continuously from the injector at least to the through hole defined by the mounting ring.

3. The combustor of claim 2, wherein the fuel tube extends continuously from the injector through the through hole defined by the mounting ring.

4. The combustor of claim 1, wherein the combustor further comprises:
   an end cover positioned at the forward end of the combustor; and
   a forward casing coupled to the end cover of the combustor, wherein the mounting ring defines a forward side and an aft side, wherein the mounting ring is attached to the forward casing of the combustor on the forward side and is attached to an outer casing of the gas turbine on the aft side.

5. The combustor of claim 1, wherein the mounting ring directly mounts the combustor to a compressor discharge casing of the gas turbine.

6. The combustor of claim 1, wherein the combustor comprises a combustion liner, and wherein the injector is a late lean injector extending at least partially through the combustion liner.

7. The combustor of claim 1, wherein attachment assembly is attached directly to the mounting ring and directly to the fuel tube.

8. A gas turbine comprising:
   a compressor portion;
   a combustor assembly in communication with the compressor portion; and
   a turbine portion in communication with the combustor assembly, the combustor assembly comprising a combustor, the combustor defining an axial direction and a forward end, the combustor comprising
      a fuel nozzle extending from the forward end of the combustor for injecting a fuel into a primary combustion zone within a hot gas path of the combustor;
      a mounting ring for mounting the combustor to a casing of the gas turbine, the mounting ring positioned aft of the forward end of the combustor and defining a through hole;
      an injector positioned aft of the mounting ring in the axial direction for injecting a fuel into a secondary combustion zone within the hot gas path of the combustor located downstream of the primary combustion zone;
      a fuel tube extending from the injector towards the mounting ring; and
      an attachment assembly movably attaching the fuel tube to the mounting ring such that the fuel tube is movable relative to the mounting ring to accommodate a thermal expansion or contraction of the fuel tube along the axial direction, the attachment assembly being a separate assembly from the fuel tube and including a bellows assembly, a fuel tube flange, and a tube fitting, the bellows assembly defining a variable length along the axial direction and extending between a first end and a second end, the bellows assembly attached to the mounting ring at the first end using the fuel tube flange and attached to the fuel tube at the second end using the tube fitting, the tube fitting extending through the through hole of the mounting ring.

9. The gas turbine of claim 8, wherein the fuel tube extends continuously from the injector at least to the through hole defined by the mounting ring.

10. The gas turbine of claim 9, wherein the fuel tube extends continuously from the injector through the through hole defined by the mounting ring.

11. The gas turbine of claim 8, wherein the mounting ring is attached to or made integrally with a forward casing of the combustor.

* * * * *